United States Patent
Holmstadt et al.

(10) Patent No.: US 10,082,784 B2
(45) Date of Patent: Sep. 25, 2018

(54) SATURATION-CONTROLLED LOOP CURRENT REGULATOR

(71) Applicant: Rosemount, Inc., Shakopee, MN (US)

(72) Inventors: Clarence Edward Holmstadt, Chaska, MN (US); Robert Ernest LaRoche, Shakopee, MN (US); Steven J. McCoy, Eden Prairie, MN (US)

(73) Assignee: ROSEMOUNT INC., Shakopee, MN (US)

( * ) Notice: Subject to any disclaimer, the term of this patent is extended or adjusted under 35 U.S.C. 154(b) by 326 days.

(21) Appl. No.: 14/672,641

(22) Filed: Mar. 30, 2015

(65) Prior Publication Data

US 2016/0291579 A1 Oct. 6, 2016

(51) Int. Cl.
*G05B 9/02* (2006.01)
*G05B 19/414* (2006.01)
*G05B 19/042* (2006.01)

(52) U.S. Cl.
CPC ......... *G05B 19/414* (2013.01); *G05B 19/042* (2013.01); *G05B 2219/25428* (2013.01); *G05B 2219/31121* (2013.01); *G05B 2219/41411* (2013.01)

(58) Field of Classification Search
CPC ............................. G05B 19/414; G05B 19/042
USPC .......................................................... 700/79
See application file for complete search history.

(56) References Cited

U.S. PATENT DOCUMENTS

| | | | |
|---|---|---|---|
| 3,010,031 A | 11/1961 | Baker | |
| 3,939,399 A * | 2/1976 | Funatsu | G05F 1/565 323/275 |
| 4,206,397 A | 6/1980 | Dahlke | |
| 4,394,703 A * | 7/1983 | Butcher | H02H 3/087 330/207 P |
| 4,731,830 A * | 3/1988 | Thomson | H04M 19/08 323/223 |
| 4,929,910 A * | 5/1990 | Pace | H03F 3/45089 330/257 |
| 5,077,490 A * | 12/1991 | Brown | H03K 17/0422 326/110 |
| 5,179,488 A | 1/1993 | Rovner | |
| 5,187,474 A | 2/1993 | Kielb et al. | |
| 5,245,333 A | 9/1993 | Anderson et al. | |
| 5,363,249 A * | 11/1994 | Fitzmorris | G11B 5/02 360/46 |

(Continued)

FOREIGN PATENT DOCUMENTS

| | | |
|---|---|---|
| CN | 201450456 | 5/2010 |
| CN | 101976092 | 2/2011 |

(Continued)

OTHER PUBLICATIONS

Search Report and Written Opinion in International application No. PCT/US2016/020572 dated Jul. 18, 2016.

(Continued)

*Primary Examiner* — Vincent Tran

(74) *Attorney, Agent, or Firm* — Westman, Champlin & Koehler, P.A.

(57) ABSTRACT

A process transmitter includes device circuitry that generates values that are to be conveyed on a current loop. A series control transistor is in series between the current loop and the device circuitry and a saturation prevention circuit prevents the series control transistor from entering saturation.

15 Claims, 7 Drawing Sheets

(56) References Cited

U.S. PATENT DOCUMENTS

| | | | | |
|---|---|---|---|---|
| 5,481,216 A | * | 1/1996 | Yeung | H03K 17/0414 326/18 |
| 5,535,243 A | * | 7/1996 | Voegele | G05B 15/02 340/870.16 |
| 5,973,942 A | | 10/1999 | Nelson et al. | |
| 6,388,431 B1 | | 5/2002 | Kramer et al. | |
| 6,813,318 B1 | | 11/2004 | Westfield et al. | |
| 7,187,158 B2 | | 3/2007 | Huisenga et al. | |
| 7,970,063 B2 | | 6/2011 | Schulte | |
| 8,310,088 B2 | | 11/2012 | Kah et al. | |
| 8,786,128 B2 | | 7/2014 | Schulte | |
| 8,787,848 B2 | | 7/2014 | Kielb et al. | |
| 2004/0184517 A1 | * | 9/2004 | Westfield | G01D 3/08 375/219 |
| 2005/0030185 A1 | | 2/2005 | Huisenga et al. | |
| 2005/0231182 A1 | | 10/2005 | Huisenga et al. | |
| 2007/0091524 A1 | * | 4/2007 | Davis | H01L 27/0285 361/56 |
| 2007/0152645 A1 | | 7/2007 | Orth | |
| 2008/0129261 A1 | * | 6/2008 | Oelmaier | G05F 1/56 323/273 |
| 2009/0224730 A1 | * | 9/2009 | Schulte | G05B 19/0423 323/220 |
| 2009/0256625 A1 | * | 10/2009 | Jung | H03K 5/08 327/536 |
| 2009/0309558 A1 | * | 12/2009 | Kielb | G05B 19/0423 323/234 |
| 2010/0145541 A1 | * | 6/2010 | Simon | G01D 21/00 700/295 |
| 2010/0305896 A1 | * | 12/2010 | Chemisky | G01D 3/036 702/85 |
| 2011/0282467 A1 | * | 11/2011 | Schulte | G05B 19/0423 700/22 |
| 2012/0188005 A1 | * | 7/2012 | Bachmann | G01D 3/02 327/541 |
| 2013/0009271 A1 | * | 1/2013 | Babcock | H01L 21/84 257/477 |
| 2013/0107406 A1 | * | 5/2013 | Johnson | H02H 3/202 361/84 |
| 2014/0104000 A1 | * | 4/2014 | Gerstenhaber | H03F 1/3211 330/257 |
| 2014/0347033 A1 | * | 11/2014 | Dymek | G01R 19/0092 324/76.11 |
| 2015/0338860 A1 | * | 11/2015 | Lugli | G05B 19/0425 700/40 |

FOREIGN PATENT DOCUMENTS

| | | |
|---|---|---|
| WO | 00/26739 A1 | 11/2000 |
| WO | 02/13160 A2 | 2/2002 |

OTHER PUBLICATIONS

Mario Lehwald: "Die Elektronik Hobby—Bastelecke", Jan. 1, 2014, XP55286670, Retrieved from the Internet: URL: http://www.hobby-bastelecke.de/halbleiter/transistor_saettigung.htm [retrieved on Jul. 7, 2016] p. 2, paragraph 6.

Anonymous: "Baker Clamp", Jul. 8, 2007, XP55286783, Retrieved from the Internet: URL:http://www.home.mira.net/~gnb/audio/bakerclamp.html [retrieved on Jul. 7, 2016] the whole document.

Office Action from Chinese Patent Application No. 201510638773.7, dated Mar. 3, 2017.

Office Action from European Patent Application No. 16711925.4, dated Nov. 8, 2017.

Office Action from Chinese Patent Application No. 201510638773.7, dated Nov. 6, 2017.

Office Action from Chinese Patent Application No. 201510638773.7, dated Apr. 2, 2018.

* cited by examiner

SATURATION-CONTROLLED LOOP CURRENT REGULATOR

BACKGROUND

Embodiments described below relate to process field devices. In particular, the embodiments relate to loop current regulators in in process environments.

Process field devices are used in industrial process control systems to monitor and/or control industrial processes. A control device is a process field device which is used to control the process. Example control devices include pumps, valves, actuators, solenoids, motors, mixers, agitators, breakers, crushers, rollers, mills, ball millers, kneaders, filters, blenders, cyclones, centrifuges, towers, dryers, conveyors, separators, elevators, hoists, heaters, coolers, and other such equipment. A process transmitter is a process field device which is used to sense (or monitor) operation of the process, for example by monitoring a process variable such as temperature, pressure, flow, etc. The monitored process variable is transmitted so that it can be used by other equipment in the process, for example by a central control room.

Two-wire process field devices receive power from and communicate over a two-wire process control loop. One standard type of two-wire process control loop uses a 4-20 mA current level on the control loop to represent a process variable or a state of a control device. In such a configuration, a field device can control the current level to a value, such as 10 mA, which is representative of a sensed process variable such as pressure. In other embodiments, digital values are encoded on the two-wire loop using a communication standard such as the HART® communication protocol, Fieldbus or Profibus, for example In order to reduce the amount of wiring required to couple to a process field device, many process field devices are entirely powered with power received from the two-wire process control loop. Thus, the total amount of power available to the process field device is limited. For example, in a 4-20 mA current loop, the total power available is limited by the lowest level at which the current level can be set (for example 3.6 mA) and the maximum voltage drop available across the device (for example something less than 24 volts in an intrinsic safe location). This is less than 0.09 watts of available power for the device.

In many cases, the functionality of a process device is limited by the amount of power available on the two-wire process control loop. For example, additional functionality may require addition computational capabilities from a microprocessor. This increased computational power requires greater electrical power and may exceed the power budget available from the loop. In order to increase the amount of power available to circuitry in a process field device, field devices typically utilize highly efficient power supplies to convert power received from the two-wire process control loop into a regulated voltage level for use by internal circuitry. One type of power supply, the switching regulator, has been used in process field devices due to its efficiency in providing a regulated supply voltage to the components of the device.

The discussion above is merely provided for general background information and is not intended to be used as an aid in determining the scope of the claimed subject matter. The claimed subject matter is not limited to implementations that solve any or all disadvantages noted in the background.

SUMMARY

A process transmitter includes device circuitry that generates values that are to be conveyed on a current loop. A series control transistor is in series between the current loop and the device circuitry and a saturation prevention circuit prevents the series control transistor from entering saturation.

In accordance with a further embodiment, a process field device includes control loop connectors for connection to a process control loop, device circuitry, and a current regulator in series between a control loop connector and the device circuitry. The current regulator controls a current level on the control loop and provides a power output that has a maximum power that scales with a voltage provided on the process control loop.

In accordance with a further embodiment, a process field device includes two loop connectors for connection to a current loop, device circuitry, and a current controller in series between one of the two loop connectors and the device circuitry. The current controller is capable of controlling a current level in the current loop while providing a fixed voltage drop between the current loop and the device circuitry for a plurality of current levels in the current loop.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Figure 1:
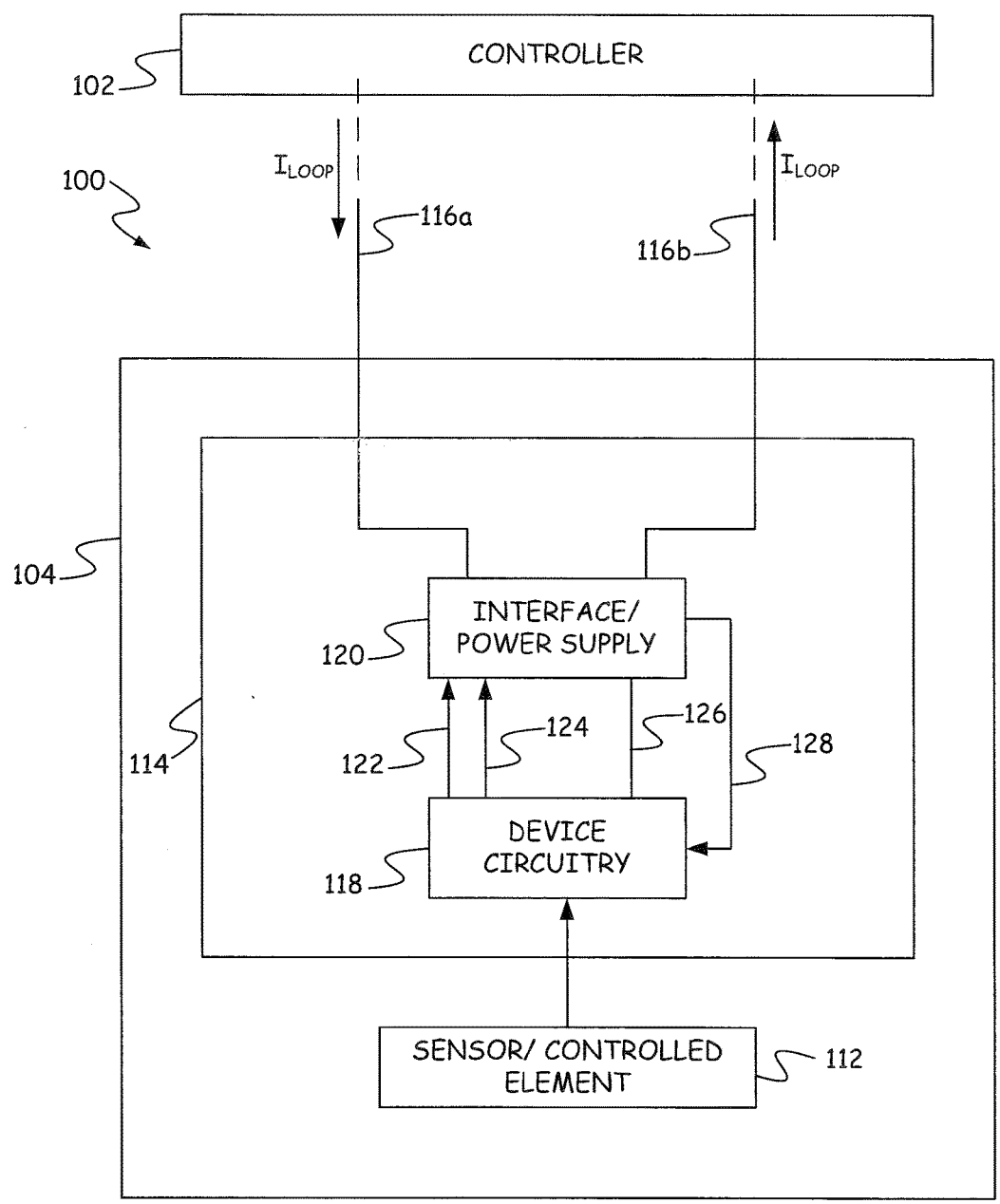
FIG. 1 provides a block diagram of a process environment including a process field device, two-wire loop and controller.

FIG. 1 is a block diagram of a process environment 100 that includes a controller 102 and a field device 104. Field device 104 includes sensor/controlled element 112 and electronics 114, which is coupled to two-wire control loop 116a and 116b. Electronics 114 includes device circuitry 118 and interface/power supply circuitry 120. In accordance with one embodiment, field device 104 is in communication with controller 102 through two-wire loop 116a/116b.

When field device 104 is a process transmitter it generates a process variable such as temperature, pressure, or flow based on signals from sensor 112 and transmits the information to the controller over two-wire loop 116a/116b. When field device 104 is a process control device, it alters controlled element 112 based on instructions sent over two-wire loop 116a/116b from controller 102 and/or provides state information regarding controlled element 112 to controller 102 over two-wire loop 116a/116b. The transmissions from the field device can be made, for example, by controlling the flow of current I through loop 116a/116b between a 4 mA signal which represents a minimum value and a 20 mA signal which represents a full scale value. In addition, field device 104 can set the current to signify alarms with a low alarm at 3.6 mA and a high alarm at 23 mA. Device circuitry 118 receives a signal from sensor/controlled element 112 and controls circuitry 120 to modulate loop current I. Additionally, in some communication protocols such as the HART® standard, device circuitry 118 is in digital communication over loop 116a/116b and digitally transmits the process variables through interface 120. Device circuitry 118 sends digital information to and receives digital commands from the controller (not shown) over loop 116a/116b. Circuitry 120 also uses loop current I to power field device 104.

FIG. 1 also shows the various inputs and outputs between device circuitry 118 and interface/power supply 120. Digital information is provided to interface/power supply 120 over data line 124. An analog output for device circuitry 118 is provided to interface/power supply 120 through line 122. Information received from loop 116a/116b is provided to device circuitry 118 through data line 126. Additionally, electrical power is supplied to device circuitry 118 by interface/power supply 120 over power line 128 in accordance with one embodiment.

Prior to the introduction of loop scavenging and variable liftoff transmitter designs, field devices had a lower operating current limit equal to the minimum loop current. This meant that all of the device circuitry 118 was required to operate at the low alarm current of 3.6 mA. In a practical sense, transmitters were designed for operation below 3 mA to allow enough margin for reliable operation. For twelve volt liftoff operation, this leaves less than 36 mW of theoretically available power for field device operations.

In recent years, it has been desired to add more functionality to process devices. Additional processing power, higher detail displays, diagnostics, backlighting, etc. have been and will be used in new transmitter designs. Many of these features take additional power that, prior to the loop scavenging techniques, have not been possible.

Figure 2:
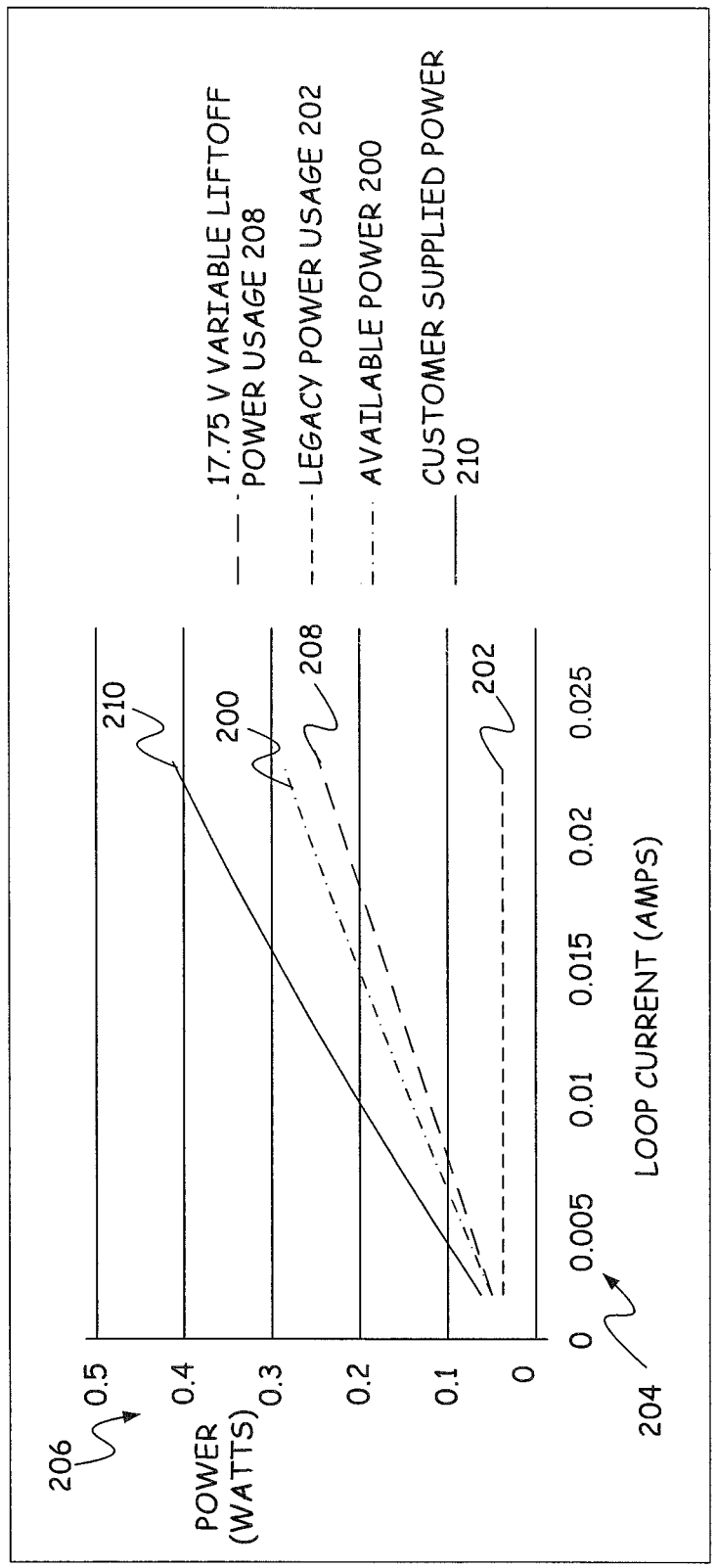
FIG. 2 provides graphs of power available at various loop currents for various power schemes.

Existing 4-20 mA field devices have a specified minimum operating voltage and specific high and low alarm currents. HART®-compliant load resistors must be between 250 ohms and 1100 ohms. If a liftoff voltage of 12 volts and high and low alarm currents of 23 mA and 3.6 mA are assumed, the minimum supply voltage, minimum supply power and maximum supply power are calculated as;

$V_{supply\text{-}min} = (250 \text{ ohms} * 0.023 \text{ A}) + 12V = 17.75 \text{ Volts}$ $P_{Supply\text{-}min} = (17.75V * 0.0036 \text{ A}) = 0.064 \text{ watts}$ $P_{Supply\text{-}max} = (17.75V * 0.023 \text{ A}) = 0.408 \text{ watts}$ The minimum and maximum power supplied to a 250 ohm load resistor is calculated as:

$P_{Load\text{-}min} = (250 \text{ ohms} * 0.0036 \text{ A}) * 0.0036 \text{ A} = 0.003 \text{ watts}$ $P_{Load\text{-}max} = (250 \text{ ohms} * 0.023 \text{ A}) * 0.023 \text{ A} = 0.132 \text{ watts}$ This leaves a minimum and maximum amount of power at the field device terminals of:

$P_{Transmitter\text{-}min} = (17.75V * 0.0036 \text{ A}) - (250 \text{ ohms} * 0.0036 \text{ A}) * 0.0036 \text{ A} = 0.061 \text{ watts}$ $P_{Transmitter\text{-}max} = (17.75V * 0.023 \text{ A}) - (250 \text{ ohms} * 0.023 \text{ A}) * 0.023 \text{ A} = 0.276 \text{ watts}$ FIG. 2 shows graphs of power as a function of loop current with the loop current shown on horizontal axis 204 and power shown on vertical axis 206. The minimum power at the Transmitter under the conditions described above are shown in FIG. 2 as Minimum Available Power 200.

Legacy transmitters with a fixed liftoff voltage of 12 volts were able to use a maximum power of:

$P_{LegacyTransmitter\text{-}max\text{-}usage} = (12V * 0.0036 \text{ A}) = 0.043 \text{ watts}$ Such legacy transmitters had a realistic available power of:

$P_{LegacyTransmitter\text{-}realistic\text{-}usage} = (9V * 0.003 \text{ A}) = 0.027 \text{ watts}$ FIG. 2 shows the maximum power usage of a legacy transmitter as line 202. As shown, legacy transmitters were not able to use the full amount of power available at the transmitter for a 17.75 V power supply.

A variable liftoff circuit uses known parameters like loop set current and circuit assumptions like minimum HART loop resistance and power supply voltage in an attempt to maximize the power in the field device. Using these parameters, the operating points of internal regulators can be adjusted to better utilize the power available at any given loop current. In particular, it is possible to further increase the power in the field device by dynamically adjusting the field device's internal supply rail voltage. Variable liftoff puts a constraint on the input voltage range of the field device. Variable liftoff assumes a minimum supply voltage of 17.75 volts, a valid HART load resistor of 250 ohms and a terminal voltage of 12 volts at 20 mA loop current. U.S. Pat. No. 7,970,063 by Schulte, entitle VARIABLE LIFTOFF VOLTAGE PROCESS FIELD DEIVCE, relates to such variable liftoff voltage.

Using these assumptions, the minimum and maximum power available to the transmitter using variable liftoff are:

$P_{VariableLOTransmitter\text{-}min} = ((17.75V - 0.75V) - (250 \text{ ohms} * 0.0036 \text{ A})) * 0.0036 \text{ A} = 0.058 \text{ watts}$ $P_{VariableLOTransmitter\text{-}max} = ((17.75V - 0.75V) - (250 \text{ ohms} * 0.023 \text{ A})) * 0.023 \text{ A} = 0.259 \text{ watts}$ where (0.75V) is a non-saturation voltage drop of a voltage regulator. Graph 208 of FIG. 2 shows the power usage of a variable liftoff transmitter designed for a 17.75 V power supply.

One short coming of the variable liftoff circuit is that it assumes operation at a minimum HART specified supply voltage and loop resistance. Although the calculations show that the transmitter will theoretically operate with a 17.75 volt supply, most customers will use a power supply with substantially higher voltage, frequently one supplying 24 volts. In a case where a customer is supply the transmitter with a 24 volt supply and using a 250 ohm load, there is a substantial amount of power available to the transmitter that is not utilized during variable liftoff as shown by customer-supplied power 210 in FIG. 2, which is calculated as:

$P_{VariableLOTransmitter\text{-}min} = ((24V - 0.75V) - (250 \text{ ohms} * 0.0036 \text{ A})) * 0.0036 \text{ A} = 0.080 \text{ watts}$ $P_{VariableLOTransmitter\text{-}max} = ((24V - 0.75V) - (250 \text{ ohms} * 0.023 \text{ A})) * 0.023 \text{ A} = 0.403 \text{ watts}$ This additional power is most notable at the 4 mA point where it is most needed. Here there is 39% more available power that could be captured.

In addition, the maximum power delivered to the measurement circuitry under the prior art does not scale with the voltage of the power supply. Instead, the maximum power for the measurement circuitry is limited either by the product of the maximum current and the static liftoff voltage or the maximum product of the loop current and a variable liftoff voltage. As a result, as a customer increases their supply voltage, there is no way to increase the maximum power supplied to the transmitter circuitry.

Figure 3:
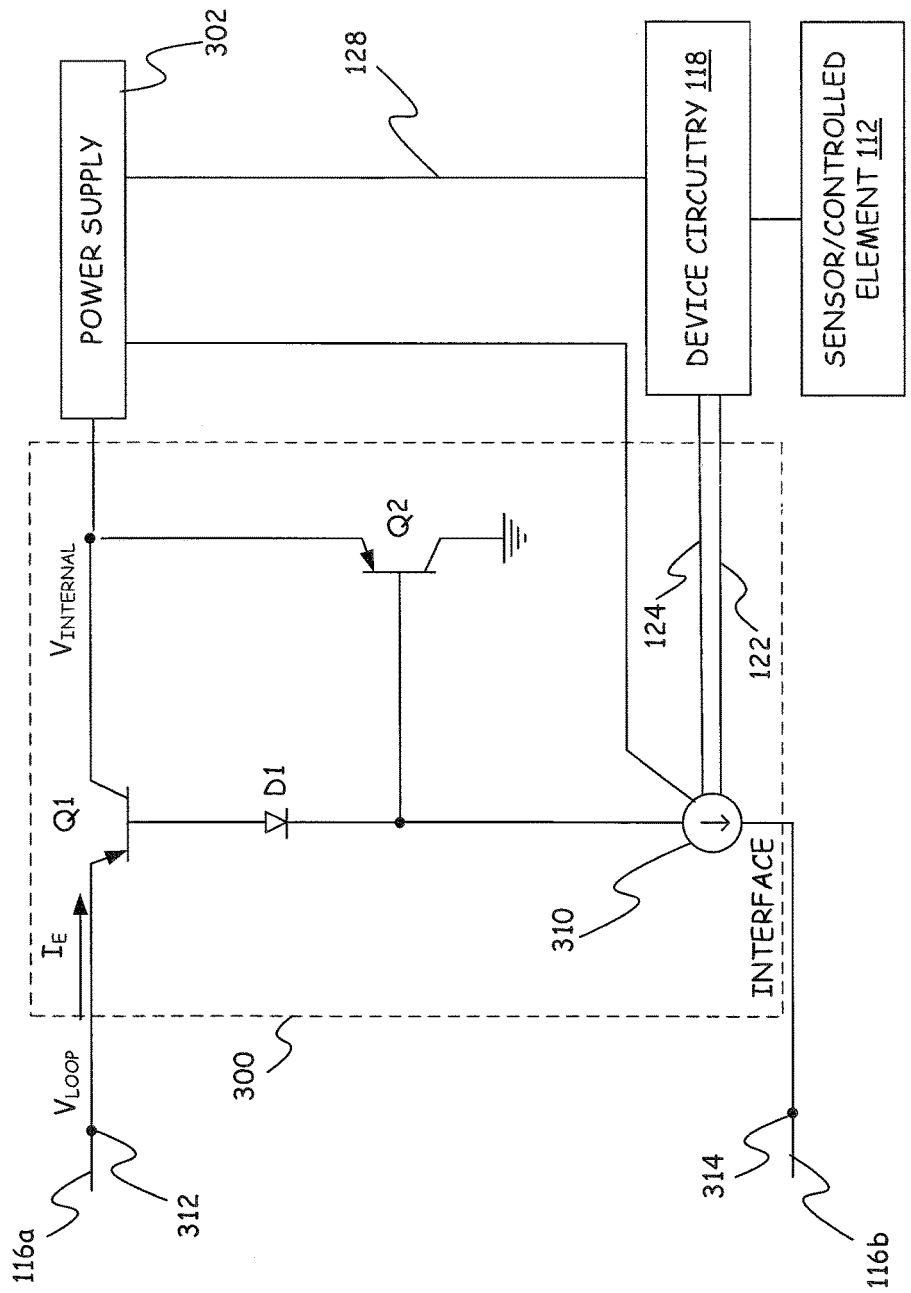
FIG. 3 provides a combination block diagram and circuit diagram of a process field device in accordance with one embodiment.

FIG. 3 provides a combination block and circuit diagram of a field device showing an interface 300 of one embodiment positioned relative to the current loop 116a/116b, a power supply 302, device circuitry 118, and sensor 112. Together, interface 300 and power supply 302 form interface/power supply 120 of FIG. 1.

Interface 300 includes a series transistor or series control transistor Q1, a shunt transistor Q2, a diode D1 and a current control 310. Series transistor Q1 is in series between a loop connector 312 and power supply 302 and device circuitry 118. Loop connector 312 is connected to loop conductor 116a. Thus, series transistor Q1 is in series between loop conductor 116a and device circuitry 118. Current control 310 is connected to the base of series transistor Q1 through diode D1 and controls the emitter current $I_E$ of series transistor Q1 as long as transistor Q1 remains in the active region of operation. Current $I_E$ is the loop current on loop conductors 116a and 116b. Current controller 310 adjusts the current to represent measurement values provided on digital line 124 and analog line 122 from device circuitry 118. Current controller 310 is powered by power supply 302, which also provides power to device circuitry 118 through a power connection 128.

The voltage at the collector of transistor Q1 is referred to as $V_{internal}$. This voltage is allowed to change as a function of the loop current and the impedance encountered by the current that enters power supply 302. As a result, as the loop current increases, $V_{internal}$ will increase. This allows the maximum power available to power supply 302 to increase as the supply voltage on loop 116a/116b increases. Thus, if a larger power supply is provided, $V_{internal}$ will be allowed to increase to a higher value at the same loop currents.

If $V_{internal}$ is allowed to increase indiscriminately, it can place transistor Q1 into a saturation mode at which point current controller 310 would no longer be able to control loop current $I_E$. To avoid this, shunt transistor Q2 and diode D1 are provided to ensure that emitter-collector voltage $V_{EC}$ across series transistor Q1 is limited from dropping below the forward bias voltage on diode D1. This can be seen from the following equation:

$$V_{EC}Q1 = -V_{BE}Q1 + V_fD1 + V_{BE}Q2$$

where $V_{EC}Q1$ is the emitter-collector voltage of series transistor Q1, $V_{BE}Q1$ is the base-emitter voltage of series transistor Q1, $V_fD1$ is the forward bias voltage of diode D1 and $V_{BE}Q2$ is the base-emitter voltage of shunt transistor Q2. If series transistor Q1 and shunt transistor Q2 are the same transistor type with similar performance and are kept at or near the same temperature, then the $V_{BE}$ of series transistor Q1 and shunt transistor Q2 should be essentially the same and the two $V_{BE}$ terms cancel making $V_{EC}Q1 \approx V_fD1$.

Since the saturation voltage of a transistor is usually significantly less than the typical forward-bias voltage of a diode, series transistor Q1 should never saturate. As a result, shunt transistor Q2 and diode D1 are a bias circuit that act as a saturation control circuit or saturation prevention circuit that keeps series transistor Q1 out of saturation.

Figure 4:
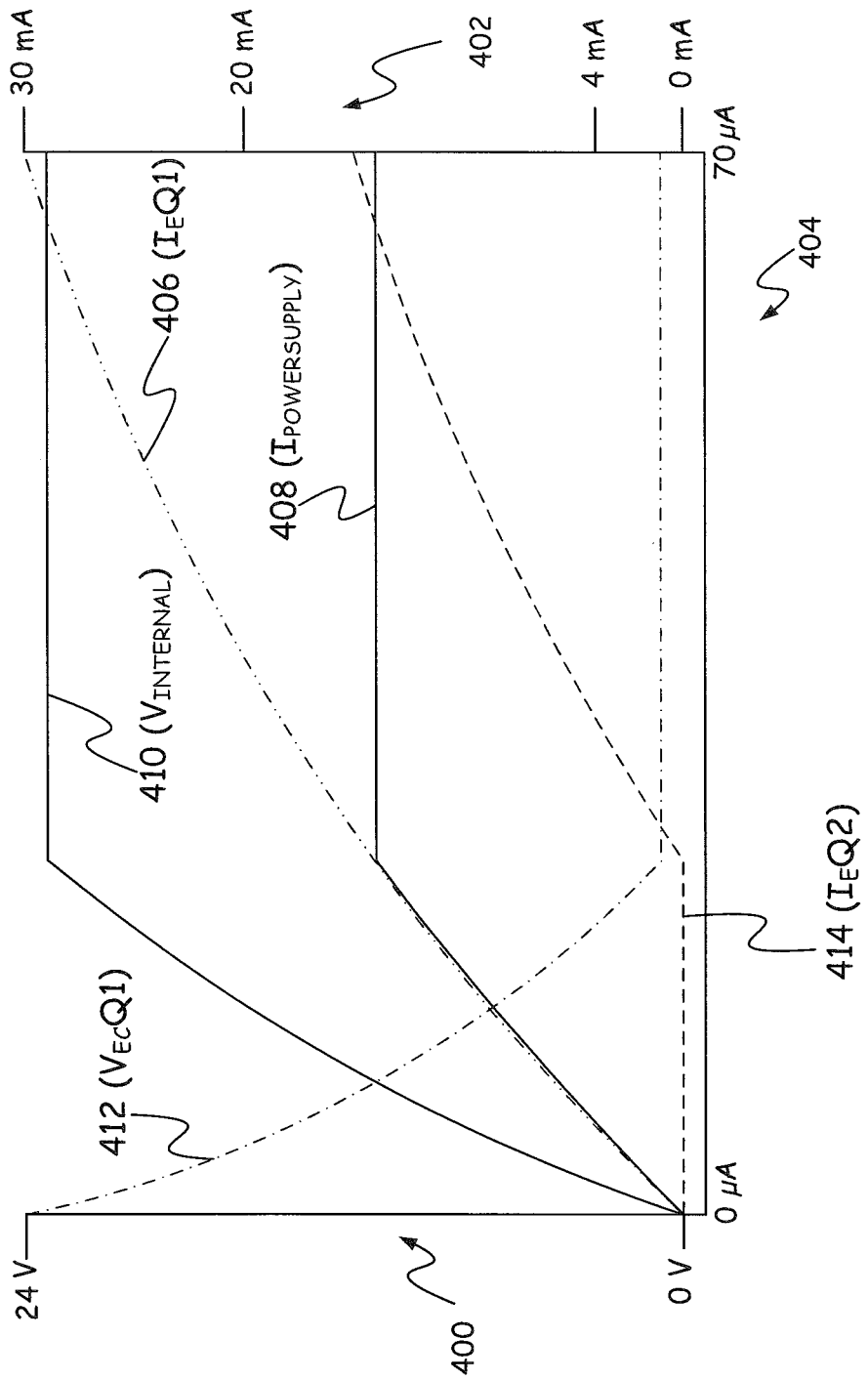
FIG. 4 provides a graph of voltages and currents of various components in the interface of FIG. 3.

FIG. 4 shows a collection of voltages and currents for components in interface 300 when a fixed supply voltage of 24 volts is provided across loop connectors 312 and 314 and the loop current is swept between 0 mA and 30 mA. In FIG. 4, vertical axis 400 shows voltage values for voltages depicted in FIG. 4 and vertical axis 402 shows current values for currents depicted in FIG. 4. Horizontal axis 404 indicates the current drawn by current control 310, which causes loop current 406 to be swept from 0 mA to 30 mA. As the loop current increases, power supply 302 draws current 408, which substantially matches loop current 406 initially. The current drawn by power supply 302 causes the internal voltage $V_{internal}$ 410 to increase as a function of the impedance encountered by the current that enters power supply 302. As $V_{internal}$ 410 increases, the voltage drop $V_{EC}$ 412 across series transistor Q1 in the direction of the loop current decreases. As $V_{internal}$ 410 approaches the supply voltage across loop connectors 312 and 314, shunt transistor Q2 begins to conduct an emitter current $I_E$ 414 that shunts current away from power supply 302 causing power supply current 408 to remain substantially fixed. This in turn causes $V_{internal}$ 410 to remain substantially fixed and the voltage 412 across series transistor Q1 to remain substantially fixed at the forward bias voltage of diode D1. It should be noted that after shunt transistor Q2 begins to conduct, $V_{internal}$ 410 provided to power supply 302 is equal to the voltage supplied across loop connectors 312 and 314 less the forward bias voltage across diode D1. As a result, if a customer increases the supply voltage, then $V_{internal}$ 410 will also increase providing a larger voltage to power supply 302 and thereby providing a larger maximum power to power supply 302. In other words, the maximum power provided to power supply 302 scales with the supply voltage provided on the current loop.

As shown in FIG. 4, series transistor Q1 provides a substantially fixed voltage drop between the current loop and the device circuitry for a plurality of current levels in the current loop. In particular, when shunt transistor Q2 begins to conduct current, the emitter-collector voltage across Q1 becomes substantially fixed and does not change as a function of the loop current.

Figure 5:
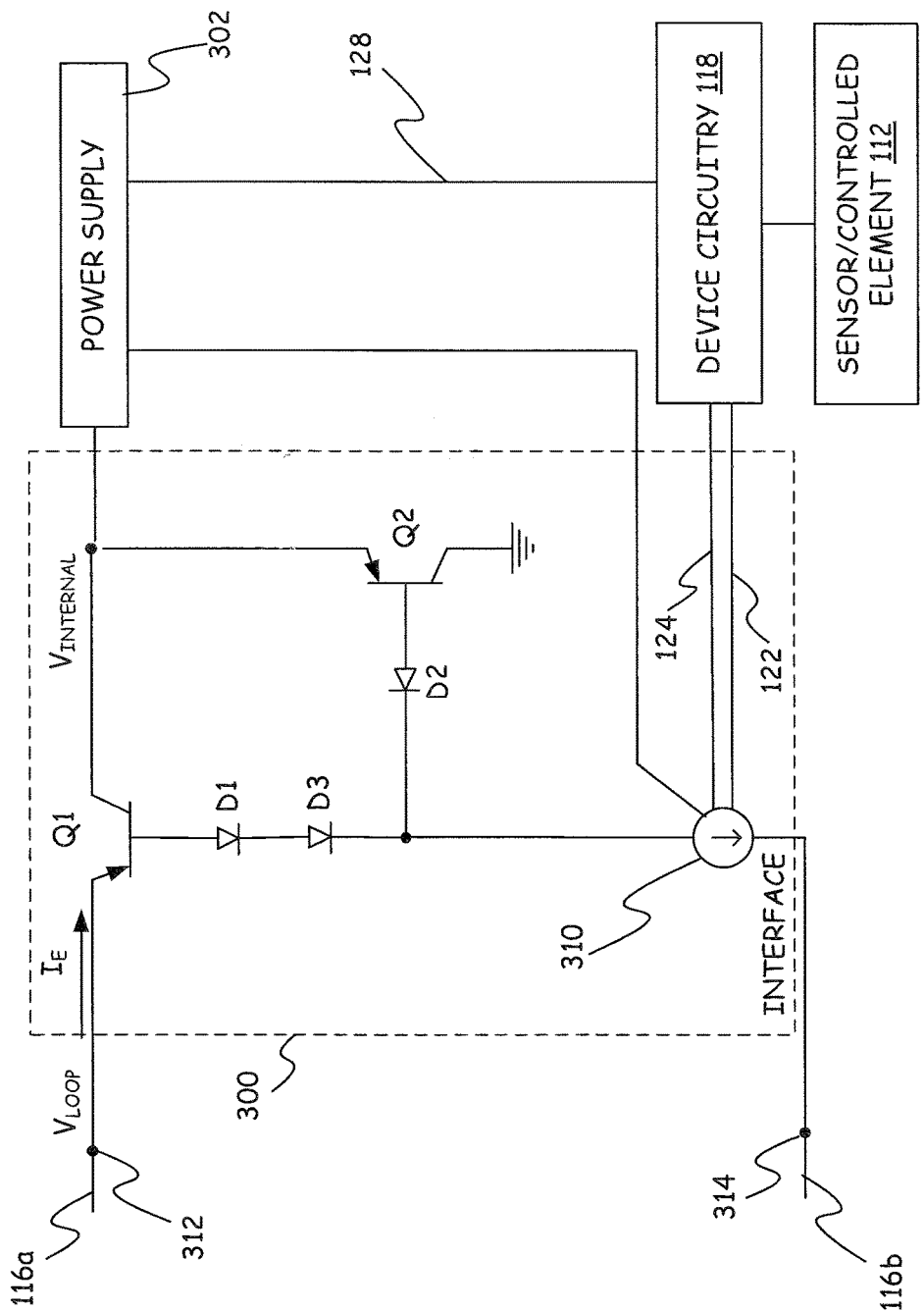
FIG. 5 provides a combination block diagram and circuit diagram of a process field device in accordance with a further embodiment.

FIG. 5 provides a combination circuit and block diagram of a second embodiment of the process field device. In the second embodiment, two additional diodes D2 and D3 have been added and the remaining circuit elements are the same as described in FIG. 3. Diode D2 has been added in FIG. 5 to help prevent the base-emitter voltage of shunt transistor Q2 from exceeding the reverse breakdown voltage for transistor Q2. In particular, should a condition occur where $V_{internal}$ is held in a voltage-limited state with high load currents and no shunt currents, such that $V_{loop} - V_{internal} \geq V_{BE}Q1 + V_fD1 + \sim 5v$, shunt transistor Q2 will begin to conduct base to emitter. Diode D2 prevents this current flow. However, adding diode D2 causes an additional voltage drop that must be balanced by adding another diode to the base connection of series transistor Q1, in particular diode D3. This changes the $V_{EC}Q1$ formula described above to:

$$V_{EC}Q1 = -V_{BE}Q1 + V_fD1 + V_fD3 + V_{BE}Q2 - V_fD2$$

where $V_fD3$ is the forward bias voltage through diode D3 and $V_fD2$ is the forward bias voltage through diode D2. If $V_fD2$ and $V_fD3$ are equal, they cancel and fall out of the equation. This will occur when D2 and D3 are matched such that regardless of the temperature they have the same forward bias voltage as each other. In order to make this more likely, in some embodiments, a dual diode package containing both diode D2 and diode D3 is used to minimize any imbalance between the two diodes and to minimize any thermally induced voltage differences between diodes D2 and D3. Similarly, series transistor Q1 and shunt transistor Q2 are preferably matched such that there are no thermally induced voltage differences in the base-emitter voltages $V_{BE}$ of transistors Q1 and Q2. In FIG. 5, shunt transistor Q2 and diodes D1, D2 and D3 are a bias circuit that act as a saturation control circuit or saturation prevention circuit that prevents series transistor Q1 from entering saturation.

Figure 6:
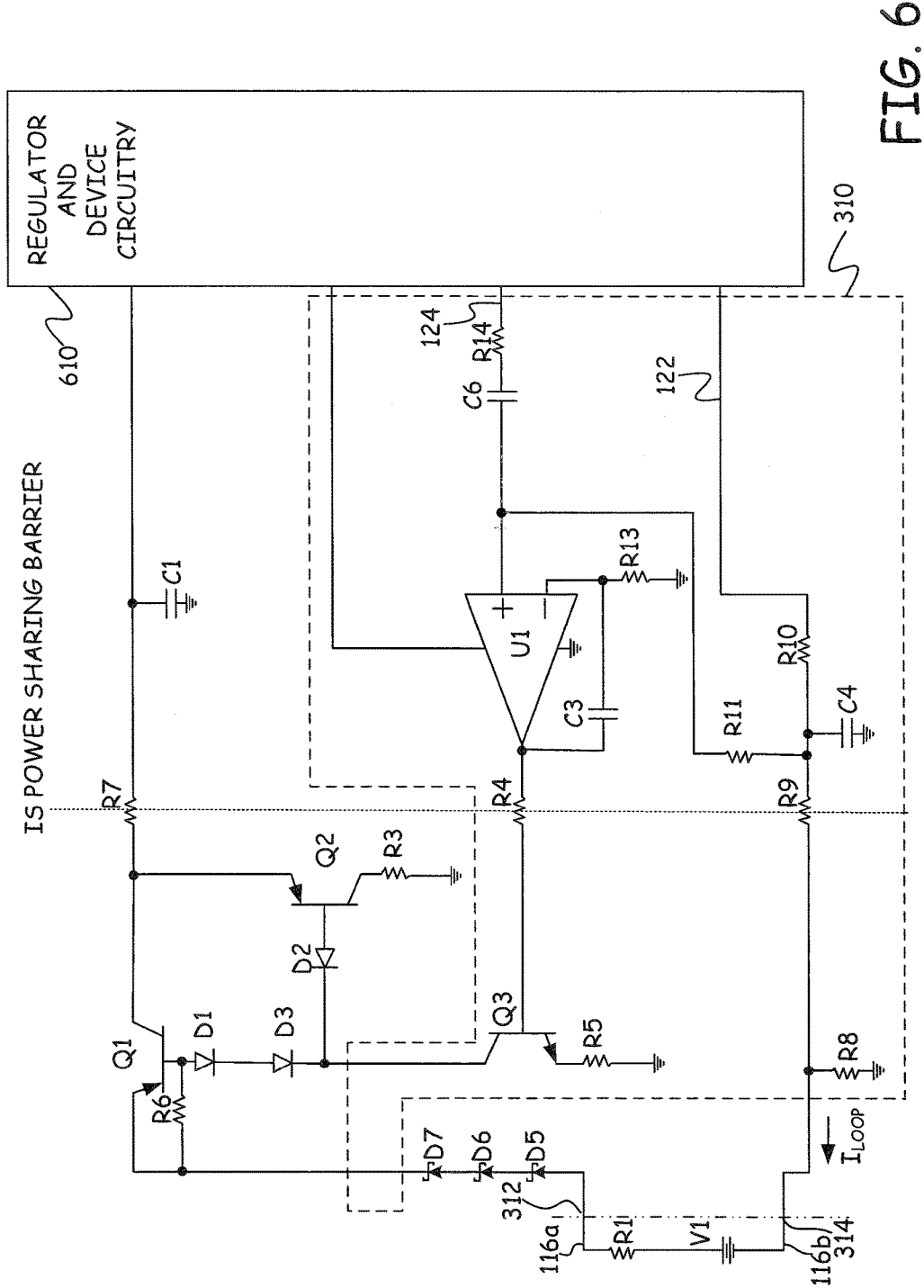
FIG. 6 provides a combination block and circuit diagram of the process environment of FIG. 1 in accordance with one embodiment.

FIG. 6 provides a more detailed diagram of process environment 100 of FIG. 1 in accordance with one embodiment. In FIG. 6, power supply 302 and device circuitry 118 have been combined with sensor/controlled element 112 to form regulator and device circuitry 610. Current loop 116a/116b is shown to be connected to a power supply voltage V1 and a load resistor R1. Diodes D5, D6 and D7, which are connected in series to current loop conductor 116a, are used for capacitance blocking. In some designs, diodes D5, D6 and D7 are not present.

Series transistor Q1, shunt transistor Q2 and diodes D1, D2 and D3 operate the same as discussed above. Current control 310 is implemented using operational amplifier U1, transistor Q3, resistors R4, R5, R6, R7, R8, R9, R10, R11, R13 and R14 and capacitors C2, C3, C4, and C6. Operational amplifier U1 receives power from regulator and device circuitry 610.

Digital information is provided on line 124 through resistor R14 and capacitor C6 to the non-inverting input of operational amplifier U1. Resistor R14 sets the signaling level and capacitor C6 decouples any DC currents.

The inverting input of operational amplifier U1 is connected to resistor R13, which has its opposite end connected to common. Capacitor C3 connects the inverting input to the output of operational amplifier U1. The output of operational amplifier U1 is also connected through resistor R4 to the base of transistor Q3, which has its emitter connected to resistor R5. The collector of transistor Q3 is connected to the cathodes of diodes D2 and D3 and to resistor R6, which is connected to the cathode of diode D7 and the emitter of series transistor Q1. Resistor R6 provides bias to transistor Q3 and promotes better transitions between various loop control points. The base resistor R4 limits the currents to transistor Q3 and provides an integrated circuit power limiting barrier. Resistor R5 provides feedback to help stabilize the circuit.

The non-inverting input of operational amplifier U1 is also connected to resistor R12, which in turn is connected to capacitor C2 and resistor R11. The other end of resistor R11 is connected to one side of resistor R9 and the other end of capacitor C2 is connected to the other side of resistor R9. Resistor R10 is connected to analog input line 122 and its other end is connected to resistor R9 and to capacitor C4. The other end of capacitor C4 is coupled to ground. One end of resistor R8 is connected to capacitor C2 and resistor R9 and the other end of resistor R8 is connected to common. Resistors R11 and R13 and capacitor C3 provide filtering and stabilizing feedback for the current control circuit. Resistor R8 is a feedback resistor for setting the loop current. In particular, resistors R8, R9 and R10 along with the output voltage on analog line 122 ($V_{dac}$) set the loop current using the following formula:

$$I_{loop} = \left(\frac{V_{dac}}{R10}\right) \times \left(\frac{R9}{R8}\right)$$

where $I_{loop}$ is the loop current and $V_{dac}$ is the voltage on analog line 122.

R7 is an IS power sharing resistor to limit heat rise of the components in the transmitter circuitry. C1 is the bulk capacitance of the internal system supply rail. This power supply rail feeds a regulator (switching, linear or shunt type) in regulator and device circuitry 610 that supplies power to the rest of the device circuitry.

In accordance with one embodiment, the interface of FIG. 6 can be used with a high-voltage/low-current high-efficient switching converter like those available from Maxim and Texas Instruments. These regulators are designed to handle high input voltages (around 60V) while maintaining high efficiencies at low currents. Using the saturation control loop current regulator along with the switching regulator allows the transmitter power to scale with the customer supplied power.

Figure 7:
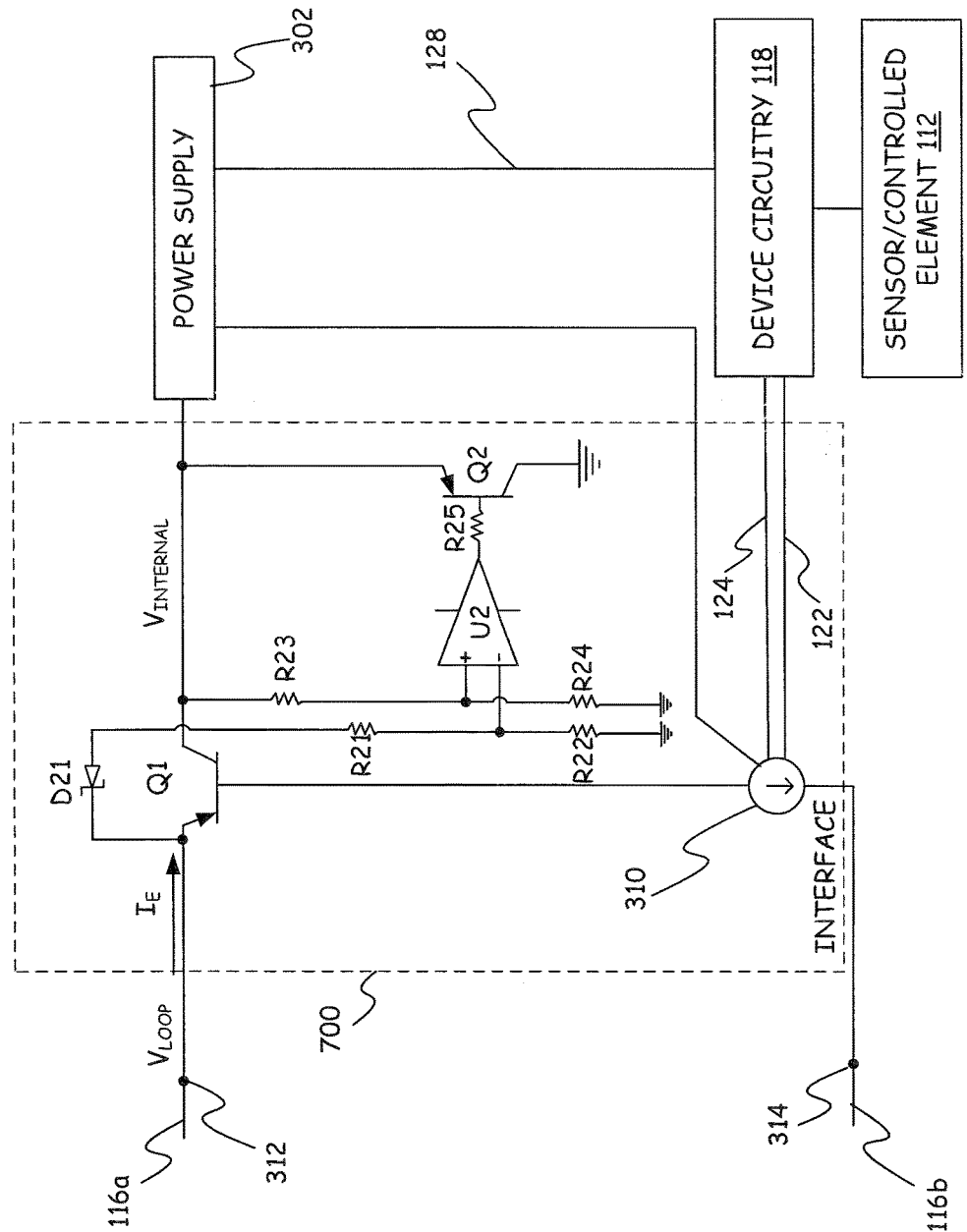
FIG. 7 provides a combination block diagram and circuit diagram of a process field device in accordance with a further embodiment.

FIG. 7 provides a combination block and circuit diagram of a field device such as the field device of FIG. 3 with an interface 700 which is an alternative to interface 300 of FIG. 3. The elements that are common to FIGS. 3 and 7 are designated with the same reference numbers in both figures and operate in the same manner in both figures.

In FIG. 7, the saturation control circuit is altered to remove diode D1 of FIG. 3 so that the base of transistor Q1 is connected directly to current controller 310. Instead of diode D1, the saturation control circuit of FIG. 7 uses operational amplifier U2 to drive transistor Q2 so that the voltage difference between $V_{LOOP}$ and $V_{internal}$ is above the saturation voltage of transistor Q1. The non-inverting input of operational amplifier U2 is connected to a voltage divider formed by resistors R23 and R24 between $V_{internal}$ and circuit common. The inverting input of operational amplifier U2 is connected to a voltage divider formed by resistors R21 and R22 between an anode of a zener diode D21 and circuit common. The cathode of zener diode D21 is connected to loop connector 312. The output of operational amplifier U2 is connected to the base of transistor Q2 through a resistor R25.

In one embodiment, the values of resistors R21 and R23 are set equal to each other and the values of resistors R22 and R24 are set equal to each other. With such values, operational amplifier U2 will drive transistor Q2 so that $V_{internal}$ is maintained at $V_{LOOP}-V_{break}$, where $V_{break}$ is the breakdown voltage of zener diode D21. In other embodiments, other values may be selected for one or more of resistors R21, R22, R23 and R24 to tune the voltage of $V_{internal}$. In still further embodiments, zener diode D1 can be removed and resistor R21 can be connected directly to loop connector 312. In such embodiments, the values of resistors R21, R22, R23 and R24 are selected to ensure that $V_{internal}$ is a desired proportion of $V_{LOOP}$.

In the embodiments above, a number of saturation control circuits have been described. Other saturations control circuits are contemplated. For example, in the embodiments above, $V_{internal}$ was not limited. However, the saturation control circuit and series transistor can be used in embodiments in which $V_{internal}$ is clamped or limited by some type of shunt circuit. For example, a zener diode or other control circuits can be used to shunt current to limit the voltage. Even though clamping limits the maximum available power and some of the power scaling capabilities of the design, the circuit still provides the operational benefits and additional power at low loop currents where it is most needed.

Although liftoff voltages of 12 volts have been referred to above, embodiments may be practiced with many different liftoff voltages.

The embodiments above provide all the power advantages of previous variable liftoff, HART® scavenging loop regulators and energy scavenging type loop regulators. HART® scavenging loop regulators store energy from one part of a HART® transmission and use the stored energy during a second part of the HART® transmission. Energy scavenging type loop regulators take advantage of the available power at the field device by employing regulators that are able to conserve a significant portion of the available power at the field device terminals and use it for additional functions. In addition, the embodiments do not limit the customer to a minimum loop resistance. In addition, the embodiments described above can be used where it is desirable to minimize the liftoff voltage of the transmitter. The embodiments also intrinsically help prevent on-scale failure conditions at any given terminal voltage without the need of software control. The circuit is also compatible with various Intrinsic Safety schemes.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A process transmitter comprising:
   device circuitry that generates values that are to be conveyed on a current loop;
   a series control transistor in series between the current loop and the device circuitry; and
   a saturation prevention circuit that prevents the series control transistor from entering saturation by preventing a voltage across the series control transistor measured between an emitter and a collector of the series control transistor from dropping below a forward bias voltage of a diode in the saturation prevention circuit.

2. The process transmitter of claim 1 wherein the saturation prevention circuit comprises a shunt transistor having an emitter coupled to a collector of the series control transistor and a base coupled to a base of the series control transistor through a conduction path that includes the diode.

3. The process transmitter of claim 2 wherein the emitter of the shunt transistor is connected directly to the collector of the series control transistor.

4. The process transmitter of claim 3 wherein the conduction path between the base of the shunt transistor and the base of the series control transistor comprises three diodes.

5. The process transmitter of claim 4 wherein at least two of the diodes are matched.

6. The process transmitter of claim 2 wherein the series control transistor and the shunt transistor are matched so as to provide substantially similar base-emitter voltage drops.

7. A process field device comprising:
   control loop connectors for connection to a process control loop;
   device circuitry; and
   an interface in series between a control loop connector and the device circuitry wherein the interface controls a current level on the control loop and provides a power output that has a maximum power that scales with a voltage provided on the process control loop wherein the interface comprises a series transistor and a bias circuit wherein the bias circuit of the series transistor prevents the series transistor from saturating by limiting an emitter-collector voltage across the series transistor from dropping below a forward bias voltage drop across a diode.

8. The process field device of claim 7 wherein the bias circuit comprises a diode and a shunt transistor that shunts current away from the device circuitry.

9. The process field device of claim 8 wherein the bias circuit further comprises circuit elements to prevent reverse breakdown of the shunt transistor.

10. The process field device of claim 9 wherein the circuit element to prevent reverse breakdown of the shunt transistor comprises a second diode.

11. The process field device of claim 9 wherein the anode of the diode is connected to the base of the series transistor, the cathode of the diode is connected to an anode of a third diode, the cathode of the third diode is connected to the cathode of the second diode and the anode of the second diode is connected to the base of the shunt transistor.

12. The process field device of claim 7 further comprising a switching regulator in series between the interface and the device circuitry.

13. A process field device comprising:
   two loop connectors for connection to a current loop;
   device circuitry; and
   an interface in series between one of the two loop connectors and the device circuitry such that current in the current loop passes through the interface to the device circuitry wherein the interface is capable of controlling a current level in the current loop while providing a fixed voltage drop between the current loop and the device circuitry for a plurality of current levels passing through the interface from the current loop to the device circuitry wherein the interface comprises a series transistor, a shunt transistor, and at least one diode such that the voltage drop between the current loop and the processing circuit is across the series transistor and the at least one diode and the shunt transistor prevent the voltage drop across the series transistor from being less than a forward bias voltage across the at least one diode.

14. The process field device of claim 13 wherein the interface further comprises two additional diodes wherein one of the two additional diodes substantially prevents the shunt transistor from entering a reverse breakdown state.

15. A process field device comprising:
   two loop connectors for connection to a current loop;
   device circuitry; and
   an interface in series between one of the two loop connectors and the device circuitry such that current in the current loop passes through the interface to the device circuitry wherein the interface is capable of controlling a current level in the current loop while providing a fixed voltage drop between the current loop and the device circuitry for a plurality of current levels passing through the interface from the current loop to the device circuitry wherein the interface comprises:
   a series transistor,
   a shunt transistor,
   an amplifier, wherein the amplifier is connected to the base of the shunt transistor and drives the shunt transistor to maintain a voltage drop across the series transistor;
   a first voltage divider connected to the device circuitry; and a second voltage divider connected to the current loop through a diode, wherein a non-inverting input of the amplifier is connected to the first voltage divider and an inverting input of the amplifier is connected to the second voltage divider.

\* \* \* \* \*